DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 9, 1974

921 O.G. 440

T921,010

MOLDED FABRIC-CONTAINING STRUCTURES

Ralph Edward Lacy, 1007 Kemp Road W., Greensboro, N.C. 27410

Continuation of abandoned application Ser. No. 150,710, June 7, 1971. This application Sept. 10, 1973, Ser. No. 395,468

Int. Cl. D03d *17/00*

U.S. Cl. 161—77

No Drawing. 8 Pages Specification

There is provided an improved three-dimensional molded structure comprising crimped polyester yarn wherein the improvement comprises preparing the molded structure from a knitted or woven fabric comprising underdrawn polyester fibers having an elongation from about 60 percent to 125 percent. The product is especially suitable for molded products which require high tear strength.